P. M. MARKO.
STORAGE BATTERY INDICATOR.
APPLICATION FILED DEC. 14, 1909.
964,994.
Patented July 19, 1910.
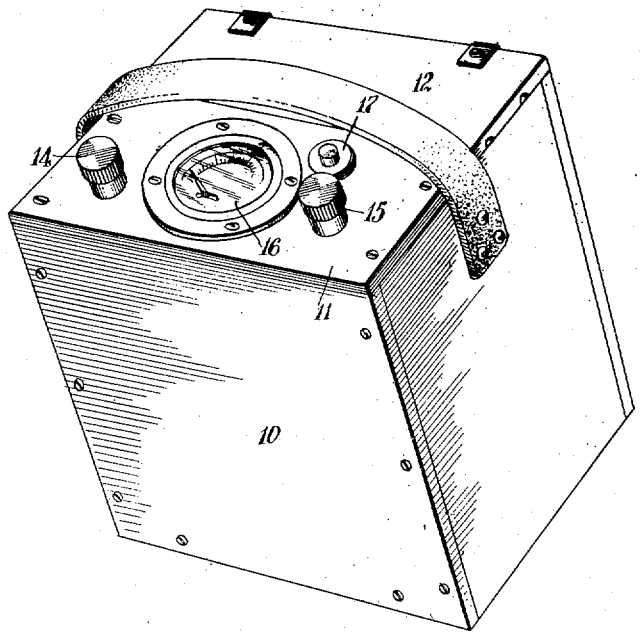
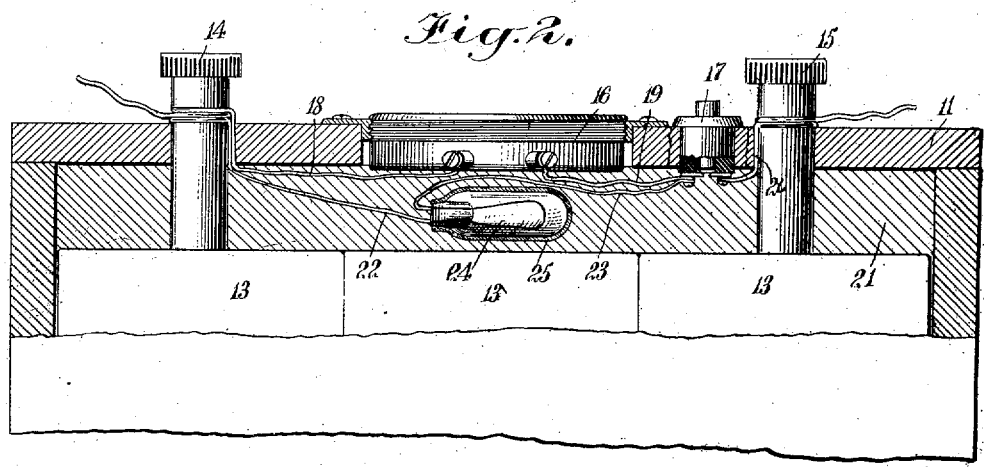
WITNESSES:
Geo. W. Naylor
C. W. Fairbanks
INVENTOR
Paul Max Marko
BY Munn & Co
ATTORNEYS

UNITED STATES PATENT OFFICE.

PAUL MAX MARKO, OF NEW YORK, N. Y.

STORAGE-BATTERY INDICATOR 964,994.

Specification of Letters Patent.  Patented July 19, 1910.

Application filed December 14, 1909.  Serial No. 532,981.

*To all whom it may concern:*

Be it known that I, PAUL MAX MARKO, a citizen of the United States, and a resident of the city of New York, borough of Brooklyn, in the county of Kings and State of New York, have invented a new and Improved Storage-Battery Indicator, of which the following is a full, clear, and exact description.

In determining the strength of the voltage of storage batteries, it is common practice to bring the two terminals of a voltmeter into contact with the two terminals of the battery, so that the battery will be short-circuited through the voltmeter. In my previous patent, Number 945,564, issued January 4, 1910, I provide a storage battery in which the voltmeter is permanently carried by the casing of the battery and provided with such connections that the circuit through the voltmeter may be closed upon the operation of a simple circuit closer. The reading obtained in the testing of a storage battery in the usual manner, is accurate, if the battery be in operation at the time the test is made, but if the battery is partly discharged and has been idle for some time, it is found that the voltmeter will show a voltage in excess of the voltage of the battery.

The object of my present invention is to provide for the testing of the battery when it is not in use, but by such means that the reading of the voltmeter will be accurate. In order to accomplish this, I provide a resistance arranged in parallel with the voltmeter, so that upon closing the circuit through the latter, the circuit will also be closed through the resistance. This puts a load on the battery which approximates the normal load on the battery when the battery is in operation, and thus the reading on the voltmeter will be substantially the same as would be the reading were the battery in operation at the time it was tested.

My invention is preferably applied to the storage battery shown in my prior patent above referred to, but it is evident that it is not necessarily limited to such construction.

Reference is to be had to the accompanying drawings, forming a part of this specification, in which similar characters of reference indicate corresponding parts in both the figures, and in which—

Figure 1 is a perspective view of a storage battery casing having an indicator in one wall thereof; and Fig. 2 is a vertical section through the upper portion of the battery casing and illustrating one embodiment of my invention.

I have illustrated my invention as applied to the device disclosed in my previous patent above referred to, and this device includes a battery casing 10, having a top wall 11 covering a portion of the top, and having a hinged cover 12, covering the remainder of the top. Within the casing are a plurality of battery cells 13, preferably connected together in series and one having a positive terminal 14 extending through the stationary portion 11 of the top wall, and another of the cells having a negative terminal 15 also extending through said stationary portion 11. Intermediate the two terminals, the top is provided with an opening into which a voltmeter 16 is secured, with its outer or upper face substantially flush with the outer wall of the top. Within another opening in the top wall, there is provided a push button 17 of any suitable form. Wires 18, 19 and 20 connect the voltmeter and push button in series between the two terminals 14 and 15. The space beneath the stationary top wall 11 and above the cells 13, is filled with wax 21 or any other suitable plastic insulating material, which will serve to insulate, conceal and protect the connections to the voltmeter and circuit closer. All of these parts are substantially the same as shown in my previous patent and may be varied to any desired extent, both as to arrangement and details of construction, without departing from the spirit of my present invention.

Within the wax 21 and preferably below the voltmeter, I provide a resistance connected by two wires 22 and 23 to the terminals 14, 15 and to the circuit closer 17. The resistance is preferably in the form of a small incandescent lamp 24, inclosed within an asbestos sleeve or tube 25. The asbestos prevents the wax from being unduly heated or melted by the heat from the lamp, and also serves to protect the glass forming the bulb of the lamp. The wax holds the asbestos tube and the bulb in place, and also holds in place the wires leading to said bulb. In some instances I may omit the asbestos tube entirely, as I preferably use a lamp of a considerably higher voltage than the voltage of the battery; for instance, in a three-cell battery adapted to deliver a six-volt current, I would use approximately a twenty-volt lamp so that the filament will not become highly heated but will merely glow. This does not heat the wax to any appreciable extent, particularly as the circuit is never closed through the lamp save for a very short interval of time. The asbestos sleeve prevents any injury to the wax even though the circuit be held closed for a considerable time. The lamp is in parallel with the voltmeter and normally no current whatever flows through either the voltmeter or the lamp, either when the battery is in operation or when it is standing idle. By closing the circuit at the push button, the current is permitted to flow not only through the voltmeter but also through the lamp. The current flowing through the lamp approximates the current which normally flows when the battery is in operation, and thus the battery will be under conditions closely approximating normal working conditions when the circuit is closed through the push button. Thus, the reading on the voltmeter will be substantially the same as it would be if the battery were tested while it is in operation.

By means of my invention, I may secure an accurate determination of the voltage of the battery after said battery has been standing idle for some time. Without my improved construction, the reading under such circumstances, would normally be a great deal higher and give a false indication as to the voltage.

Having thus described my invention, I claim as new and desire to secure by Letters Patent:

1. In combination, a storage battery cell having positive and negative terminals, a casing inclosing the cell, a shunt circuit permanently carried within the casing and connecting said terminals, said shunt circuit including a single constant resistance equal to the normal load on the battery, and a normally open circuit closer, said resistance being in circuit only upon short circuiting the battery by the circuit closer during the testing of the strength of the battery, and a voltmeter arranged in parallel with the resistance.

2. In combination, a storage battery cell having positive and negative terminals, a casing inclosing said cell, a voltmeter within the wall of said casing and having a dial visible from the exterior thereof, a single constant resistance equaling the normal load on the battery and arranged within the casing and concealed from view and in parallel with said voltmeter, and connections between the terminals of said voltmeter and the terminals of said battery casing, one of said connections including a normally open circuit closer whereby the voltmeter and resistance are normally out of circuit.

3. In combination, a storage battery cell having positive and negative terminals, a casing inclosing the same, a voltmeter carried by one wall of said casing, a constant resistance equaling the normal load on the battery and disposed within said casing, said resistance comprising an incandescent lamp and an asbestos sleeve inclosing said lamp, said resistance and said voltmeter being arranged in parallel between the terminals of the cell, and the circuit through each being normally broken, said resistance and the connections thereto being supported and concealed by a filling of insulated material between the cell and said wall of the casing.

In testimony whereof I have signed my name to this specification in the presence of two subscribing witnesses.

PAUL MAX MARKO.

Witnesses:
 CLAIR W. FAIRBANK,
 JOHN P. DAVIS.